United States Patent
Boudier

(10) Patent No.: US 9,830,163 B2
(45) Date of Patent: Nov. 28, 2017

(54) CONTROL FLOW IN A HETEROGENEOUS COMPUTER SYSTEM

(71) Applicant: ADVANCED MICRO DEVICES, INC., Sunnyvale, CA (US)

(72) Inventor: Pierre Boudier, Foix (FR)

(73) Assignee: Advanced Micro Devices, Inc., Sunnyvale, CA (US)

( * ) Notice: Subject to any disclaimer, the term of this patent is extended or adjusted under 35 U.S.C. 154(b) by 762 days.

(21) Appl. No.: 13/912,243

(22) Filed: Jun. 7, 2013

(65) Prior Publication Data

US 2013/0332702 A1    Dec. 12, 2013

Related U.S. Application Data

(60) Provisional application No. 61/657,373, filed on Jun. 8, 2012.

(51) Int. Cl.
G06F 9/38       (2006.01)
G06F 9/50       (2006.01)

(52) U.S. Cl.
CPC .......... *G06F 9/3885* (2013.01); *G06F 9/5044* (2013.01); *G06F 2209/509* (2013.01)

(58) Field of Classification Search
CPC ......... G06T 15/005; G06T 1/20; G06T 15/04; G09G 5/363; G06F 3/14
See application file for complete search history.

(56) References Cited

U.S. PATENT DOCUMENTS

| | | | |
|---|---|---|---|
| 2008/0276252 A1* | 11/2008 | Pronovost et al. | 719/318 |
| 2010/0058076 A1* | 3/2010 | Kozuch et al. | 713/193 |
| 2011/0010715 A1* | 1/2011 | Papakipos et al. | 718/100 |
| 2011/0047551 A1* | 2/2011 | Sitsky | G06F 9/505 718/100 |
| 2011/0173155 A1* | 7/2011 | Becchi et al. | 707/610 |
| 2012/0179674 A1* | 7/2012 | Delling et al. | 707/736 |
| 2013/0016110 A1* | 1/2013 | Arvo | 345/522 |
| 2013/0176320 A1* | 7/2013 | Bourges-Sevenier | 345/505 |
| 2013/0222399 A1* | 8/2013 | Bourd | G06T 1/20 345/506 |

\* cited by examiner

*Primary Examiner* — Todd Buttram
(74) *Attorney, Agent, or Firm* — Volpe and Koenig, P.C.

(57) ABSTRACT

Methods, apparatuses, and computer readable media are disclosed for control flow on a heterogeneous computer system. The method may include a first processor of a first type, for example a CPU, requesting a first kernel be executed on a second processor of a second type, for example a GPU, to process first work items. The method may include the GPU executing the first kernel to process the first work items. The first kernel may generate second work items. The GPU may execute a second kernel to process the generated second work items. The GPU may dispatch producer kernels when space is available in a work buffer. The GPU may dispatch consumer kernels to process work items in the work buffer when the work buffer has available work items. The GPU may be configured to determine a number of processing elements to execute the first kernel and the second kernel.

22 Claims, 9 Drawing Sheets

```
702 →  __kernel hello_produce(...,__global char * temp) {...}
              ↗756                              ↗750

704 →  __kernel hello_consume(...,__global char * temp) {...}
              ↗758                              ↗750

706 →  counter32_t start; counter32_t end; counter32_t ongoing;
              ↗760           ↗762              ↗764

708 →  __control hello_control(...,__global char * temp) {
                   ↗752                       ↗750
710 →  label:
                  ↗754
712 →      if (ongoing!=0) {
                  ↗766  ↗760  ↗762    ↗756    ↗757
714 →      If (hasSpace(start,end) hello_produce<...> (...);
                  ↗768  ↗760  ↗762  ↗750
716 →      If (!isEmpty(start,end, temp)) {
                  ↗758       ↗759
718 →          hello_consume<...> (...);
                  ↗770  ↗760 ↗762 ↗764
720 →          update(start,end,ongoing);
710 →      }

712 →      goto label;
714 →  }
716 → }
                                              700
```

FIG. 7

```
802 ──→  __kernel hello_kernel(__global char *
                        ╲822

╱812                    ╱814
804 ──→ out, __global char * in)
         {

╱816      ╱818
806 ──→   size_t I = get_global_id(0);

╱820    ╱822
808 ──→   out[I] = in[I];

```
...
...
902 → set GPU-VA for "in"
904 → set GPU-VA for "out"
         ... ←922
906 → label:
         ... ←766
908 → if hasSpace            ←756
910 →    set GPU-VA for hello_produce
912 →    dispatch indirect ... ←768
914 → if !isEmpty            ←758
916 →    set GPU-VA for hello_consume
918 →    dispatch indirect ... ←754           ←922
920 → if (ongoing) goto label
         ...
                    900
         ...
```

FIG. 9

CONTROL FLOW IN A HETEROGENEOUS COMPUTER SYSTEM

CROSS REFERENCE TO RELATED APPLICATION

This application claims priority to U.S. Provisional Patent Application Ser. No. 61/657,373, filed on Jun. 8, 2012, the entire contents of which are hereby incorporated by reference as if fully set forth.

TECHNICAL FIELD

Embodiments of the invention relate to improved control flow in a heterogeneous computer system, and more specifically to improved control flow for work generated at various types of processors.

BACKGROUND

A heterogeneous computer system is a computer system with different types of processor such as, for example, a central processor unit (CPU) and a graphical processor unit (GPU). The GPU may soon include thousands of processing elements while the CPU often has only several cores. Additionally, the GPU may have a separate memory from the CPU. Because GPUs are becoming a larger part of the total amount of silicon that is part of heterogeneous computer systems relative to the CPU, it has become more important to keep the GPU active to efficiently use the entire heterogeneous computer system.

Often, work flows between the CPU and to the GPU. The CPU may wait for the work to be done by the GPU, or the GPU may wait for work to be done by the CPU.

Therefore, there is a need in the art for systems and methods that provide improved control flow in a heterogeneous computer system.

SUMMARY OF EMBODIMENTS

Methods, apparatuses, and computer readable media are disclosed for improved flow control in a heterogeneous computer system.

A method for improved flow control in a heterogeneous computer system is disclosed. The method may include a processor of a first type (e.g., a CPU) requesting a first kernel be executed on a processor of a second type (e.g., a GPU) to process first work items. The method may include the GPU executing the first kernel to process the first work items. The first kernel may generate second work items. And, the method may include the GPU executing a second kernel to process the generated second work items. The GPU may be configured to determine a number of processing elements to execute the first kernel and the second kernel. The GPU may be configured to dispatch the second kernel to be executed by processing elements of the GPU.

In some embodiments, the method may include a GPU dispatching producer kernels when space is available in a work buffer. And, the method may include the GPU dispatching consumer kernels to process work items in the work buffer when the work buffer has available work items. The method may include a CPU requesting a control program be executed by the GPU to control the dispatching. The method may include returning control to the CPU when there are no more work items available. The GPU may determine a number of processing elements for the consumer kernels to execute on.

A system for control flow on a heterogeneous computer system is disclosed. The system may include a CPU configured to request a first kernel be executed on a GPU to process first work items. The GPU may be configured to execute the first kernel to process the first work items. The first kernel may generate second work items. The GPU may be configured to execute a second kernel to process the generated second work items. The GPU may include a command processor. The command processor may be configured to dispatch the second kernel to process the generated second work items. The CPU may be further configured to request a command program be executed by the command processor of the GPU to dispatch the second kernel for execution.

BRIEF DESCRIPTION OF THE DRAWINGS

Embodiments of the present invention are illustrated by way of example and not limitation in the figures of the accompanying drawings, in which like references indicate similar elements and in which:

FIG. 7 schematically illustrates a method for control flow according to some disclosed embodiments;

FIG. 8 schematically illustrates a method that may be executed by the GPU;

FIG. 9 schematically illustrates a method for control flow according to some disclosed embodiments.

DETAILED DESCRIPTION

Figure 1:
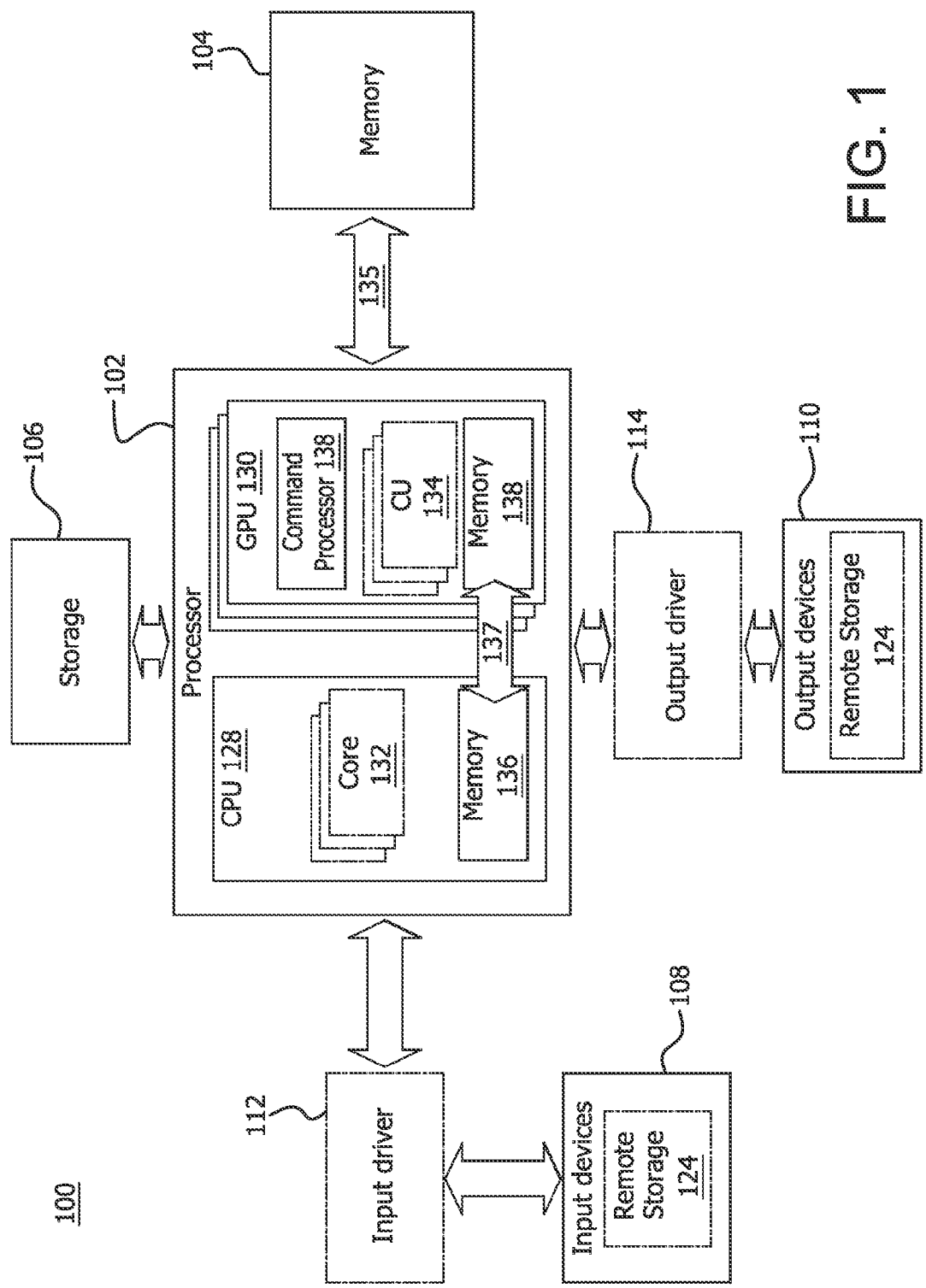
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include processing units of different types—e.g., one or more central processing units (CPU) 128, which may include one or more cores 132 (i.e., a first processor type), and one or more graphics processing unit (GPU) 130, which may include one or more compute units (CU) 134 or GPU cores (i.e., a second processor type). As known to those of ordinary skill in the art, processors of types different than the CPU and GPU are known. These other processors include, for example, digital signal processors, application processors and the like. The CPU 128 and GPU 130 may be located on the same die, or multiple dies. A command processor 140 may control a group of CUs 134. The CUs 134 each may include many processing elements 212 (see FIG. 2) that perform as single instruction multiple data (SIMD) processing elements 212. The CU 134 may include a memory 139 that may be shared among the processing elements 212.

The GPU 130 and the CPU 128 may be other types of computational elements. The CPU 128 may include memory 136 that is shared among cores of the CPU 128. In some disclosed embodiments, the memory 136 is an L2 cache. The GPU 130 may include memory 138 that is shared among the CUs 134 of one or more GPUs 130. Data may be transferred via bus 137 between the memory 136 and memory 138 and memory 139. The GPU 130 and CPU 128 may include other memories such as memory for each core 132 and memory for each of the processing elements (see FIG. 2) of the CU 134. The memories 136, 138, and 104 may be part of a coherent cache system (not illustrated). In some embodiments, one or more of the memories 136, 138, and 104 may not be coherent memory. The memory 104 may be located on the same die as the processor 102, or may be located separately from the processor 102. The memory 104 may include a volatile or non-volatile memory, for example, random access memory (RAM), dynamic RAM (DRAM), or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
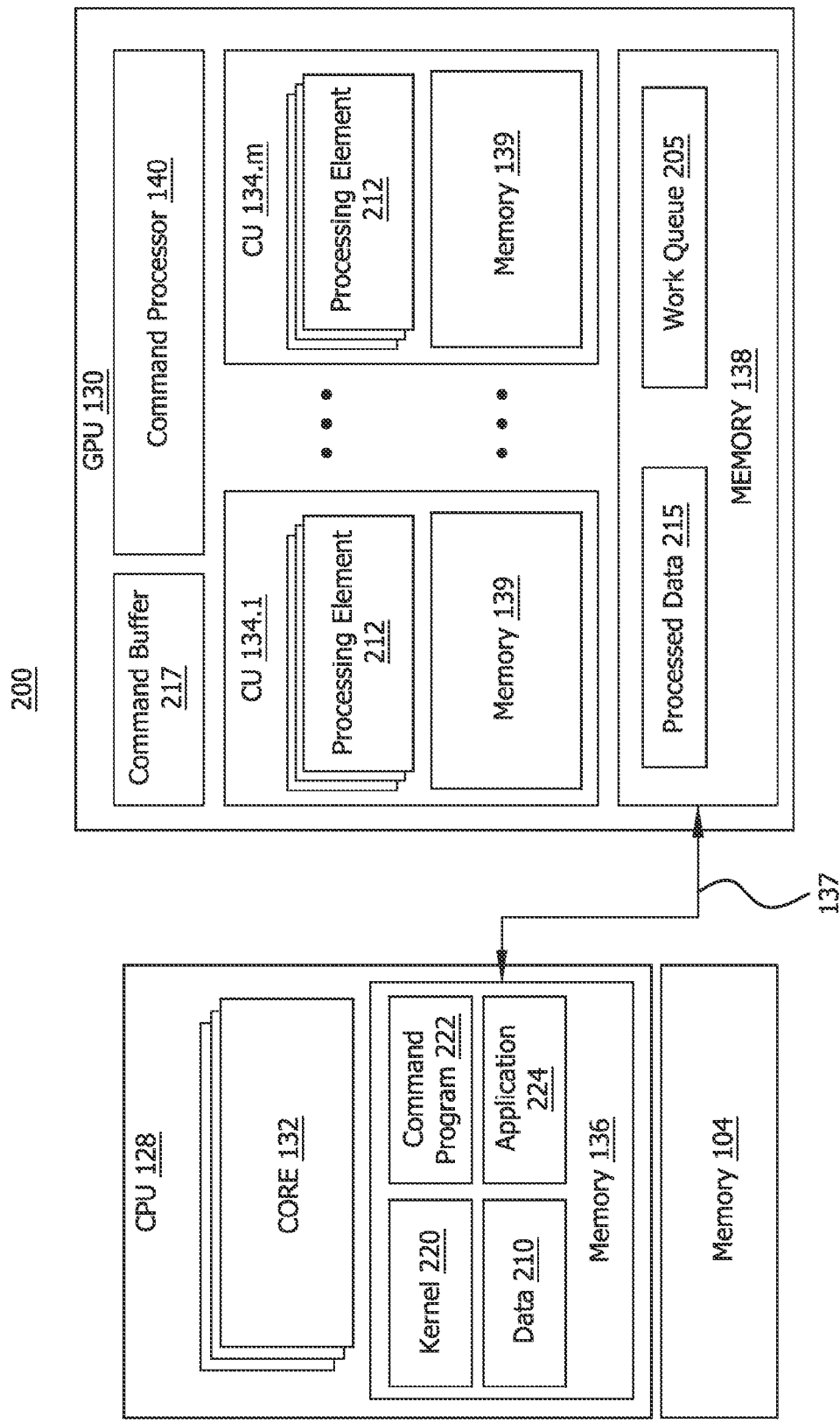
FIG. 2 is an example of an improved control flow system according to some disclosed embodiments.

FIG. 2 is an example of an improved control flow system according to some disclosed embodiments. Illustrated in FIG. 2 is a CPU 128, memory 104, bus 137, and GPU 130. The application 224 may send data 210 to a memory 138 associated with the GPU 130 and instruct that a kernel 220 be executed on the processing elements 212 and process the data 210. The application 224 may also instruct the command processor 140 to execute the command program 222.

The CPU 128 may include cores 132, and memory 136. The cores 132 may execute the application 224. The memory 136 may include kernel 220, command program 222, data 210, and application 224. The kernel 220 may be a routine to be executed by the processing elements 212. For example, the kernel 220 may be a program to process a pixel of an image that is represented by the data 210. The kernel 220 may be executed by many of the processing elements 212 for parallel execution with each processing element 212 operating on a different portion of the data 210. The data 210 may be data 210 that is to be processed by the kernel 220. For example, the data 210 may be an image or numerical numbers for a simulation of the physical world. The application 224 may be an application such as an image processing application 224 that uses both the CPU 128 and the GPU 130. The application 224 may be executed by one or more cores 132.

In some embodiments, one or more of the kernel 220, data 210, command program 222, and application 224 may be in the memory 104. The memory 104 may be a main system memory and memory 136 may be a coherent cache of memory 104. In some embodiments, the bus 137 may transfer data between the memory 104 and memory 136.

The GPU 130 may include command buffer 217, command processor 140, CU 134, and memory 138. The command buffer 217 may be a buffer that has commands for the command processor 140. The command processor 140 may control a portion of or the entire operation of the GPU 130. The command processor 140 may control the processing elements 212 by determining a kernel 220 that should be executed on each of the processing elements 212. The command processor 140 may determine the parameters of the kernel 220.

The CUs 134 may include processing elements 212 and memory 139. The processing elements 212 may be configured in groups so that each CU 134 performs instructions in a single instruction multiple data (SIMD) manner. The memory 139 may include data that is being accessed or generated by the processing elements 212.

The memory 138 may include processed data 215 and work queue 205. The processed data 215 may be data 210 that the processing elements 212 have processed. The work queue 205 may be work that is generated by the processing elements 212. Additionally, kernel 220, command program 222, data 210, application 224, processed data 210, and work queue 205, may be sent to one or more of the different memories 136, 104, 138, 139.

Figure 3:
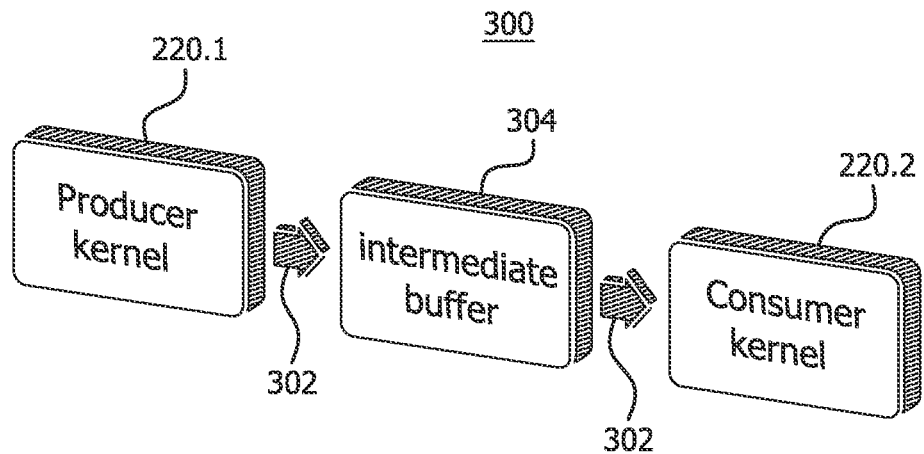
FIG. 3 is a schematic illustration of a producer kernel that may generate work and a consumer kernel that may process the work.

FIG. 3 is a schematic illustration of a producer kernel 220.1 that may generate work 302 and a consumer kernel 220.2 that may process the work 302. Illustrated in FIG. 3 is a producer kernel 220.1, intermediate buffer 304, consumer kernel 220.2, and work 302. The producer kernel 220.1 and consumer kernel 220.2 may be kernels 220 that are executed on processing elements 212 (see FIG. 2). Work 302 may be data that needs additional processing. For example, data 210 or processed data 215 that may need additional processing. The work 302 may include an indication of a kernel 220 to use to process the data. The producer kernel 220.1 may process data 210 and generate work 302, which may be processed data 215. The processed data 215 may need additional processing so that the processed data 215 is work 302 for the consumer kernel 220.2 to process. The intermediate buffer 304 may be a buffer in memory 138, 139, or 104. For example, the intermediate buffer 304 may be the processed data 215 or the work queue 20.

Figure 4:
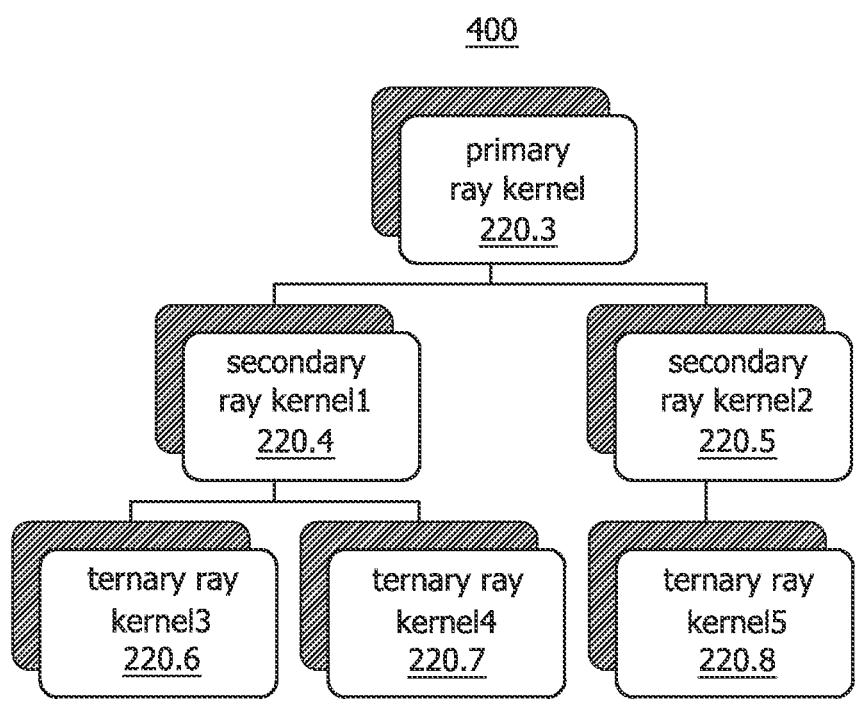
FIG. 4 schematically illustrates a processing tree where kernels generate work that is processed by the next layer of kernels.

FIG. 4 schematically illustrates a processing tree 400 where kernels 202 generate work that is processed by the next layer of kernels 202. Primary ray kernel 220.3, secondary ray kernel1 220.4, second ray kernel2 220.5, ternary ray kernel3 220.6, ternary ray kernel4 220.7, and ternary ray kernel5 220.8, are kernels 220 that may be executed on processing elements 212 (see FIG. 3). Primary ray kernel 220.3 may process data 210 and generate processed data 215. The processed data 215 may need further processing. For example, the primary ray kernel 220.3 may be a kernel 220 for ray tracing in computer graphics. The primary ray kernel 220.3 may trace a ray (not illustrated) back to an object (not illustrated), which generates the need to trace the effect of two light sources on the object. The processed data 215 would then indicate the need for the two new ray tracings by second ray kernel1 220.4 and secondary ray kernel2 220.5. The processed data 215 may then be processed by secondary ray kernel1 220.4 and secondary ray kernel2 220.5. Secondary ray kernel1 220.4 and secondary ray kernel2 220.5 may process the processed data 210 and generate new processed data 215. The processed data 215 may need further additional processing. The process data 215 may then be processed by ternary ray kernel3 220.6, ternary ray kernel4 220.7, and ternary ray kernel5 220.8, which may generate new processed data 215. The processed data 215 may not need further processing. In some disclosed embodiments, the processed data 215 may be transferred to the memory 136 or 104 after being processed by kernel3 220.6, kernel4 220.7, and kernel5 220.8.

Figure 5:
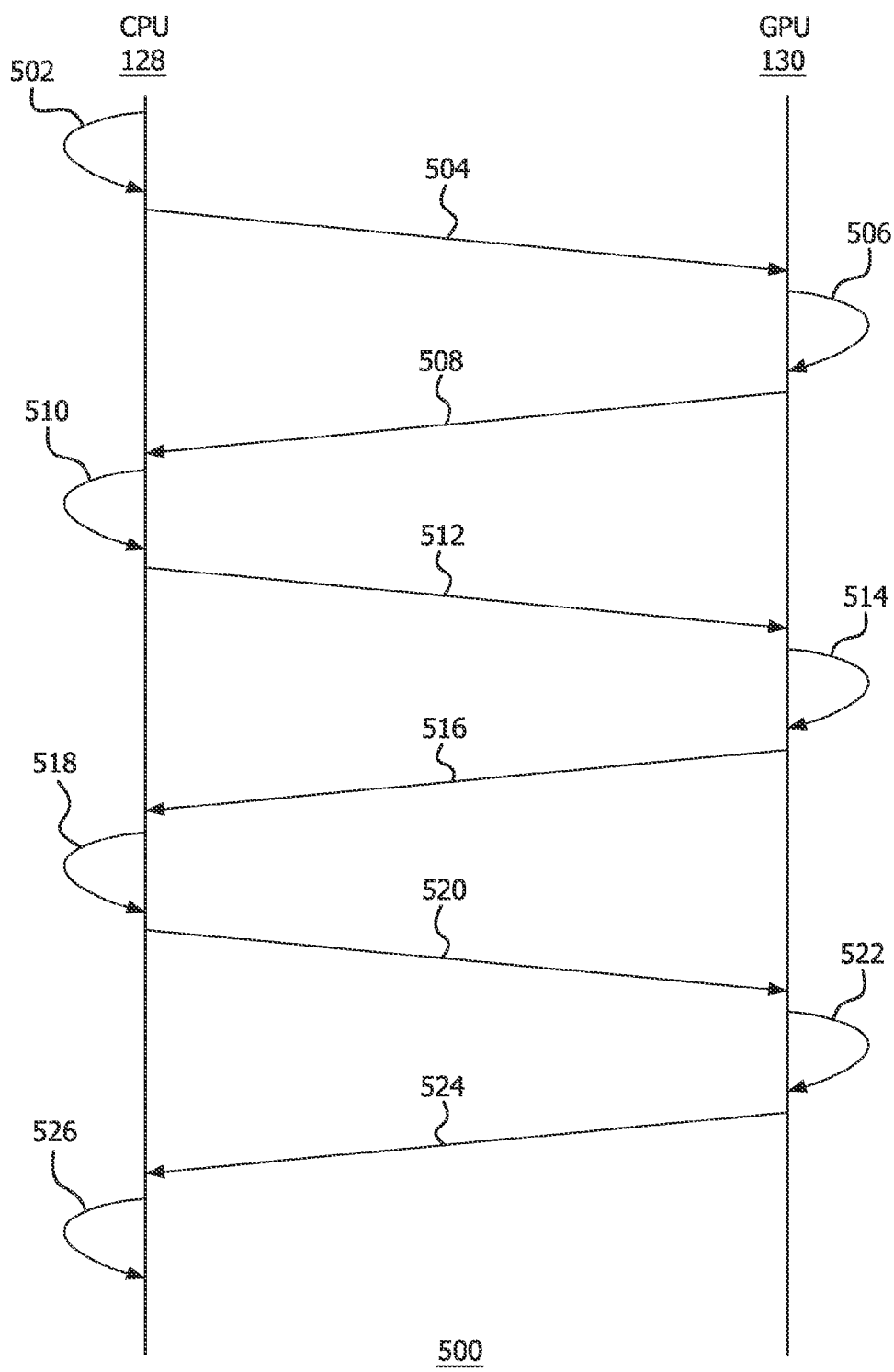
FIG. 5 schematically illustrates a time sequence diagram of the processing tree of FIG. 4 according to existing control flow.

FIG. 5 schematically illustrates a time sequence diagram of the processing tree 400 of FIG. 4 according to some existing control flows. FIG. 5 will be explained in conjunction with FIGS. 2 and 4. The control flow may start off at the CPU 128 with the application 224 determining that data 210 should be processed by primary ray kernel 220.3 at 502. The application 224 may send to the GPU 130 data 210 and instructions requesting that the GPU 130 execute primary ray kernel 220.3 on the data 210 at 504. The GPU 130 may execute the primary ray kernel 220.3 using the processing elements 212 on the data 210 to generate processed data 215 at 506. The processed data 215 may be sent from the memory 138 or memory 139 to memory 136 or memory 104 at 508. The application 224 may determine that the processed data 215 requires further processing by secondary ray kernel1 220.4 and secondary ray kernel2 220.5 at 510. The application 224 may send the processed data 215 to the memory 138 and instructions requesting that the GPU 130 execute secondary ray kernel1 220.4 and secondary ray kernel2 220.5 on the processed data 215 at 512.

The GPU may execute secondary ray kernel1 220.4 and secondary ray kernel2 220.5 on the processed data 215 to generate new processed data 215 at 514. The processed data 215 may be sent from the memory 138 or memory 139 to memory 136 or memory 104 at 516. The application 518 may determine that processed data 215 needs to be processed by ternary ray kernel3 220.6, ternary ray kernel4 220.7, and ternary ray kernel5 220.8 at 518. The application 224 may send the processed data 215 to the memory 138 and instructions requesting that the GPU 130 execute ternary ray kernel3 220.6, ternary ray kernel4 220.7, and ternary ray kernel5 220.8 on the processed data 215 at 520.

The GPU may execute ternary ray kernel3 220.6, ternary ray kernel4 220.7, and ternary ray kernel5 220.8 on the processed data 215 to generate new processed data 215 at 522. The processed data 215 may be sent from the memory 138 or memory 139 to memory 136 or memory 104 at 524. The application 224 may determine that the processed data 215 does not need further processing at 526. The control flow then went back and forth between the CPU 128 and the GPU 130 six times before the application 224 completed at 526.

Figure 6:
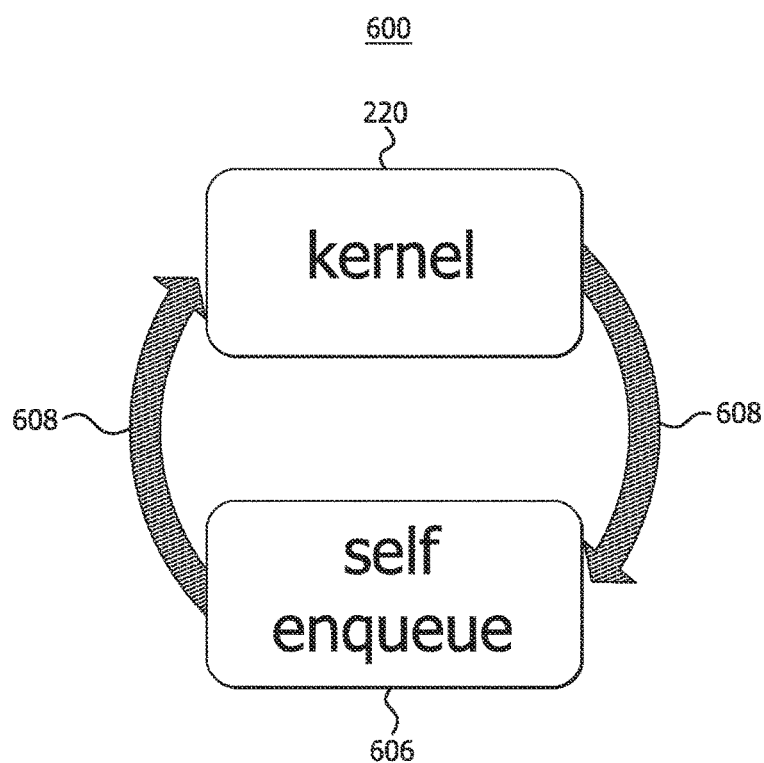
FIG. 6 schematically illustrates a control flow according to some disclosed embodiments.

FIG. 6 schematically illustrates a control flow 600 according to some disclosed embodiments. Illustrated in FIG. 6 is a kernel 220, self enqueue 606, and request 608. The kernel 220 may be executed by processing elements 212 and may process data such as data 210 to generate processed data 215. The kernel 220 may place requests 608 for the kernel 220 to be executed again in the self enqueue 606. The GPU 130 may take requests 608 from the self enqueue 606 and execute the kernel 220 according to the requests 608. In some embodiments, the kernel 220 may place requests 608 for other kernels 220 to be executed on the self enqueue 606. In some embodiments, the kernel 220 may include parameters that specify the data from the processed data 215 for the kernel 220 to execute on. In some embodiments, an extension or addition to OpenCL® may include instructions for the kernel 220 to request execution of either the same kernel 220 or another kernel 220, which would be executed on the GPU 130 by the processing elements where the flow of control does not first revert to the CPU 128.

FIG. 7 schematically illustrates a method 700 for control flow according to some disclosed embodiments. The method 700 may be a method 700 for a command processor 140. In some embodiments, an extension or addition to OpenCL® may include instructions for the application 224 to include a control method 700 that will be performed by the GPU 130. The method 700 may include declaring a hello_produce 756 kernel 220 at 702. Hello_produce 756 may be a kernel 220 that processes data 210 and generates new work in temp 750. Temp 750 may be located in a memory of the GPU 130 such as memory 138 or memory 139. In some disclosed embodiments, temp 750 may be a work queue 205. The method 700 may include declaring a hello_consume 758 kernel 220 at 704. Hello_consume 758 may be a kernel 220 that takes work in temp 750 and consumes the work by dispatching kernels 220.

Start 760 and end 762 may be declared at 706. Start 760 may indicate the start of temp 760. End 762 may indicate the end of temp 760. Ongoing 764 may indicate whether or not the method 700 should continue. Ongoing 764 may be set by the CPU 178 or the GPU 180.

Hello_control 752 may be declared at 708. Hello_control 752 may be a method 700 to control the GPU 180. The method 700 may be passed temp 750. The method 700 may begin with label at 710. The label and goto label at 712 may be used as a loop to continuously perform the method 700 as long as ongoing 754 is true, where true may have a value of 1. The method 700 may continue with "if (ongoing!=0) {" at 712. The brace "{" matches with brace "}" at 710. The portion of the method 700 between brace "{" and brace "}" is only performed if ongoing 754 is true. If ongoing is true, the method 700 continues with "if (hasspace(start, end) hello_produce< . . . >( . . . );" at 714. The if statement 714 tests whether there is space in temp 750 for new work by examining start 760 and end 762. If there is space in temp 750, then hello_produce 756 is called 714, which may produce more work that will be placed on temp 750. Hello_produce 756 may be called with suitable parameters 757 so that a kernel 220 called by hello_produce 757 will process work in temp 750 according to a number of processing elements 212 of the CUs 134.

The method 700 continues with "If (!IsEmpty(start, end, temp)) {" at 716. IsEmpty 768 may return whether or not temp 750 is empty or not. If temp 750 is not empty the method 700 continues with "hello_consume< . . . >( . . . )" at 718. Hello_consume 758 may be called which may dispatch kernels 220 to consume work on temp 750. The method 700 continues with "update(start, end, ongoing);" at 720. Update 770 may update start 760, end 762, and ongoing 764, based on any changes since the last time update 770 was called. The method 700 may continue with "goto label" which will loop back around to label 710. The method 700 may end when the CPU 128 or GPU 130 ends the method 700.

FIG. 8 schematically illustrates a method 800 that may be executed by the GPU 130. The method 800 may be kernel 220. The method 800 may begin with "_kernel hello_kernel (_global char *out, _global char *in)" at 802. The name may be hello_kernel 822. There may be two parameters out 812 and in 814. The method 800 may continue with "size_t I=get_global_id(0)" at 806. "I" 816 may be set to get_global_id(0) 818 which may be a global ID of the method 800. For example, the method 800 may be executed on each of tens or thousands of processing elements 212 and the global ID 818 may be a number such as 12 to indicate an instance of the method 800 is number 12 executing on a 12th processing element 212. The method 800 may continue with "out[I]=in[I]" at 808. The value at in[I] is moved to out[I]. The method 800 may then end at 810.

FIG. 9 schematically illustrates a method 900 for control flow according to some disclosed embodiments. The method 900 may be performed by the command processor 140. The method 900 may be stored in the command buffer 217. The method 900 may be a compilation of the method 700 by OpenCL®. Method 900 may begin with "set GPU-VA for 'in'" at 902 and "set GPU-VA for 'out'" at 904. 902 and 904 may set up the parameters for a kernel 220 that is dispatched by hello_produce 756 and hello_consume 758. For example, the kernel 220 may be the kernel 220 illustrated in FIG. 8. The method 900 may continue with "label" at 906. The label 922 may be a label for a loop between 906 and 920. The method 900 may continue with "if hasSpace" at 908. HasSpace 766 may operate as discussed in conjunction with FIG. 7. The method 900 may continue with "set GPU-VA for hello_produce" at 910. The statement at 910 may set the GPU 130 for dispatching the kernel hello_produce 756, which may dispatch the method 800. The method 900 may continue with "dispatch indirect" at 912. The statement at 912 may dispatch "hello_produce" 756.

The method 900 may continue with "if !is Empty" at 914. IsEmpty 768 may operate as described in conjunction with FIG. 700. The method 900 may continue with "set GPU-VA for hello_consume" at 918. The statement at 916 may set the GPU 130 for dispatching the kernel hello_consume 758. The method 900 may continue with "dispatch indirect" at 918. The statement at 918 may dispatch "hello_consume" 758. The method 900 may continue with "if (ongoing) goto label" at 920. The method 900 may loop back to label 922 if ongoing 754 is still true. Ongoing 754 may operate as described in conjunction with FIG. 7. The method 900 may end when ongoing 754 is no longer true.

Figure 10:
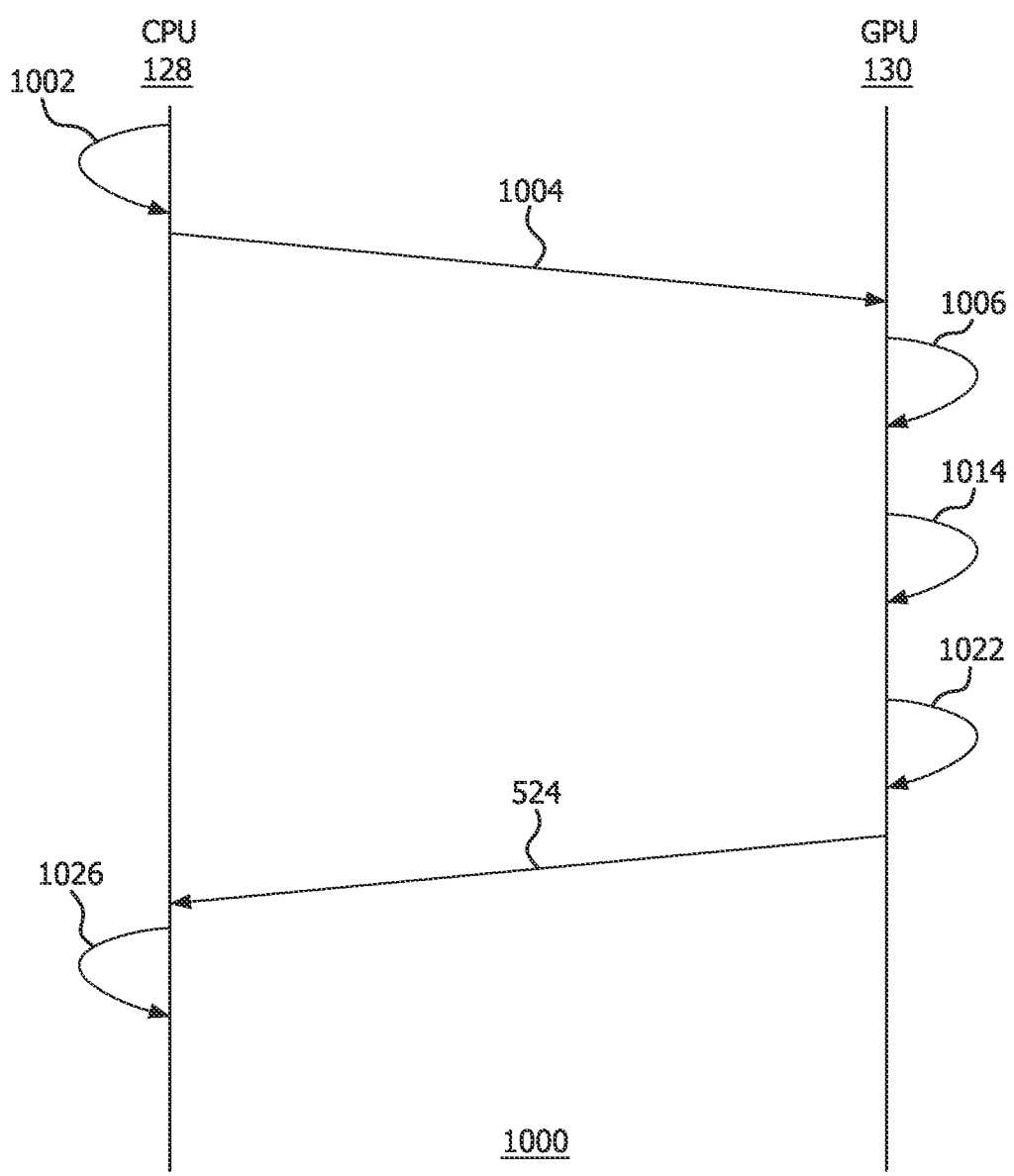
FIG. 10 schematically illustrates a time sequence diagram of the processing tree of FIG. 4 according to a control flow of some disclosed embodiments.

FIG. 10 schematically illustrates a time sequence diagram of the processing tree 400 of FIG. 4 according to a control flow of some disclosed embodiments. FIG. 10 will be explained in conjunction with FIGS. 2 and 4. The control flow may start off at the CPU 128 with the application 224 determining that data 210 should be processed by primary ray kernel 220.3 at 1002. The application 224 may send to the GPU 130 data 210 and instructions requesting that the GPU 130 execute primary ray kernel 220.3 on the data 210, and a command program 222 for the command processor 140 to perform at 1004.

The GPU 130 may execute the primary ray kernel 220.3 using the processing elements 212 on the data 210 to generate processed data 215, and may have the command processor 140 perform the command program 222 at 1006. The processed data 215 may be placed on temp 750 by primary ray kernel 220.3.

The command program 222 may determine that the processed data 215 requires further processing by secondary ray kernel1 220.4 and secondary ray kernel2 220.5, and the command program 222 may dispatch secondary ray kernel1 220.4 and secondary ray kernel2 220.5 at 1014. The GPU may execute secondary ray kernel1 220.4 and secondary ray kernel2 220.5 on the processed data 215 to generate new processed data 215 at 1014.

The command program 222 may determine that processed data 215 needs to be processed by ternary ray kernel3 220.6, ternary ray kernel4 220.7, and ternary ray kernel5 220.8, and the command program 222 may dispatch ternary ray kernel3 220.6, ternary ray kernel4 220.7, and ternary ray kernel5 220.8 at 1022. The GPU may execute ternary ray kernel3 220.6, ternary ray kernel4 220.7, and ternary ray kernel5 220.8 on the processed data 215 to generate new processed data 215 at 1022. The command program 222 may determine that there is no new work to do on the processed data 215 at 1022.

The processed data 215 may be sent from the memory 138 or memory 139 to memory 136 or memory 104 at 524. The application 224 may determine that the processed data 215 does not need further processing at 1026. The control flow then went back and forth between the CPU 128 and the GPU 130 only two times before the application 224 completed at 1026. In comparison, in FIG. 5 the control flow went back and forth between the CPU 128 and the GPU 130 six times.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a graphics processing unit (GPU), a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the disclosed embodiments.

The methods or flow charts provided herein may be implemented in a computer program, software, or firmware incorporated in a computer-readable storage medium for execution by a general purpose computer or a processor. In some embodiments, the computer-readable storage medium is a non-transitory computer-readable storage medium. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:
1. A method for control flow on a heterogeneous computer system, the method comprising:
  requesting, by a first processor of a first type, a first kernel be executed on a second processor of a second and different type to process first work items, wherein the second processor includes an integral command processor;

executing, by the second processor, the first kernel to process the first work items, wherein new data is generated as a result of the processing of the first work items, wherein the processing of the first kernel generates new second work items, wherein the new second work items comprise the new data generated as a result of the processing of the first work items;

determining, by the second processor, to execute the new second work items on the second processor based on the new data; and executing, by the second processor, a second kernel to process the new data of the new second work items.

2. The method of claim 1, wherein the first processor comprises a central processing unit (CPU) and the second processor comprises a graphics processing unit (GPU).

3. The method of claim 2, wherein the command processor of the second processor dispatches the second kernel to process the generated new second work items.

4. The method of claim 3, further comprising:
the first processor requesting a command program be executed by the command processor of the GPU to dispatch the second kernel for execution.

5. The method of claim 3, wherein the command processor determines a number of processing elements for the second kernel to be executed on by the second processor.

6. The method of claim 3, wherein the command processor selects the second kernel from a plurality of kernels.

7. The method of claim 1, further comprising:
returning control to the first processor after the new second work items are processed.

8. The method of claim 1, further comprising:
sending data to a memory associated with the second processor, and wherein executing the first kernel further comprises processing the data, and wherein executing the second kernel further comprises processing the data.

9. The method of claim 8, further comprising:
sending the processed data to a second memory associated with the first processor.

10. A method for control flow on a heterogeneous computer system, the method comprising:
dispatching, by a Graphics Processing Unit (GPU), producer kernels when space is available in a work buffer;
dispatching, by the GPU, first consumer kernels to process first work items in the work buffer when the work buffer has available work items, wherein new data is generated as a result of the processing of the first work items;
processing, by the GPU, the first work items to generate new second work items, wherein the new second work items comprise the new data generated as a result of the processing of the first work items; and
dispatching, by the GPU, second consumer kernels to process the new data of the new second work items on the GPU based on the new data.

11. The method of claim 10, wherein the method for control flow on the heterogeneous computer system further comprises:

requesting, by a Central Processing Unit (CPU), a control program be executed by the GPU to control the dispatching.

12. The method of claim 11, wherein the method for control flow on the heterogeneous computer system further comprises:
returning control to the CPU when there are no more work items available.

13. The method of claim 10, wherein the GPU determines a number of processing elements for the consumer kernels to execute on.

14. A system for control flow on a heterogeneous computer system, the system comprising:
a first processor of a first type configured to request a first kernel be executed on a second processor of a second type to process first work items; and
the second processor including an integral command processor, wherein the second processor is configured to:
execute the first kernel to process the first work items, wherein new data is generated as a result of the processing of the first work items, and wherein the execution of the first kernel generates new second work items that comprise the new data generated as a result of the processing of the first work items,
determine to execute the generated new second work items on the second processor based on the new data of the new second work items, and,
execute a second kernel to process the new data of the new second work items.

15. The system of claim 14, wherein the first processor comprises a central processing unit (CPU) and the second processor comprises a graphics processing unit (GPU).

16. The system of claim 14, wherein the command processor is further configured to dispatch the second kernel to process the generated new second work items.

17. The system of claim 16, wherein the first processor is further configured to request a command program be executed by the command processor of the second processor to dispatch the second kernel for execution.

18. The system of claim 16, wherein the command processor determines a number of processing elements for the second kernel to be executed on by the second processor.

19. The system of claim 16, wherein the command processor is further configured to select the second kernel from a plurality of kernels.

20. The system of claim 14, wherein the system is configured to return control to the first processor after the new second work items are processed.

21. The system of claim 14, wherein the first processor is further configured to send data to a memory associated with the second processor, and wherein the first kernel processes the data with the work items, and the second kernel processes the data with the new second work items.

22. The system of claim 21, wherein the system is further configured to send the processed data to a second memory associated with the first processor.

* * * * *